(No Model.) 2 Sheets—Sheet 1.
T. & J. GALVIN.
HYDRANT.
No. 337,945. Patented Mar. 16, 1886.
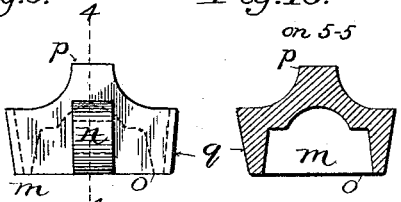
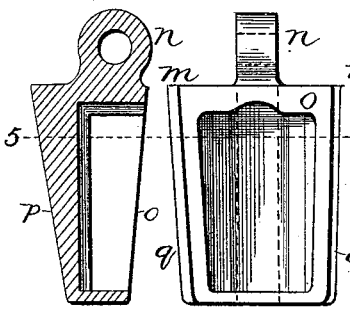
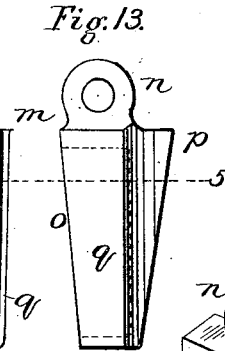
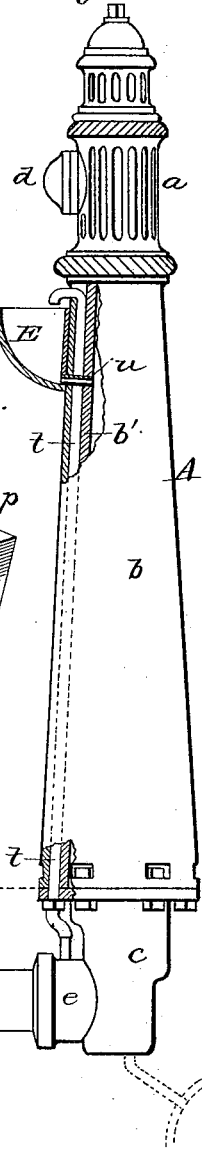
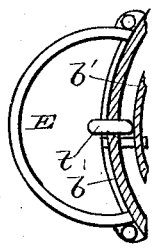
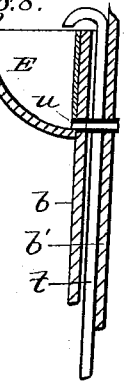
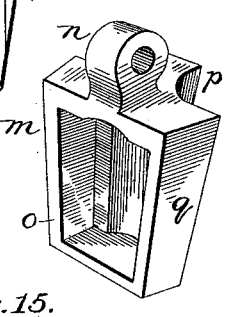
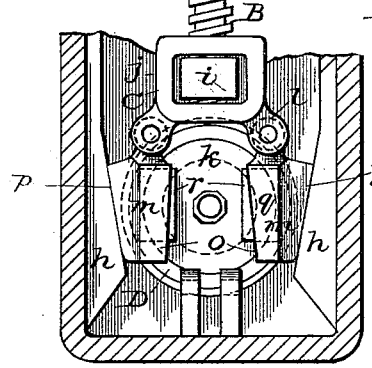
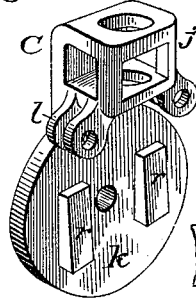
Witnesses:
James P. DesHanel
Walter S. Dodge
Inventors:
Thaddeus Galvin,
John Galvin,
by Dodgerson,
their Attys.
N. PETERS, Photo-Lithographer, Washington, D. C.

(No Model.) 2 Sheets—Sheet 2.

T. & J. GALVIN.
HYDRANT.

No. 337,945. Patented Mar. 16, 1886.

on 1-1.

on 1-1.

on 2-2.

on 2-2.

Witnesses:
James P. DuHamel
Walter S. Dodge

Inventors:
Thaddeus Galvin,
John Galvin,
by Dodge & Son,
their Attys.

UNITED STATES PATENT OFFICE.

THADDEUS GALVIN AND JOHN GALVIN, OF DETROIT, MICHIGAN.

HYDRANT.

SPECIFICATION forming part of Letters Patent No. 337,945, dated March 16, 1886.

Application filed October 30, 1885. Serial No. 181,399. (No model.)

*To all whom it may concern:*

Be it known that we, THADDEUS GALVIN and JOHN GALVIN, of Detroit, in the county of Wayne and State of Michigan, have invented certain new and useful Improvements in Hydrants, of which the following is a specification.

This invention relates to hydrants; and it consists in various features hereinafter set forth.

Figure 2:
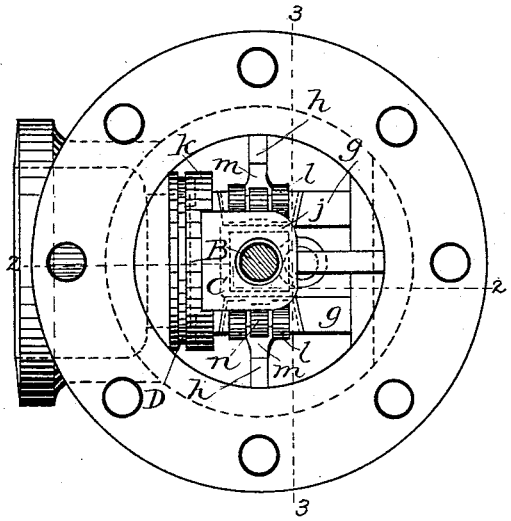
Figure 3:
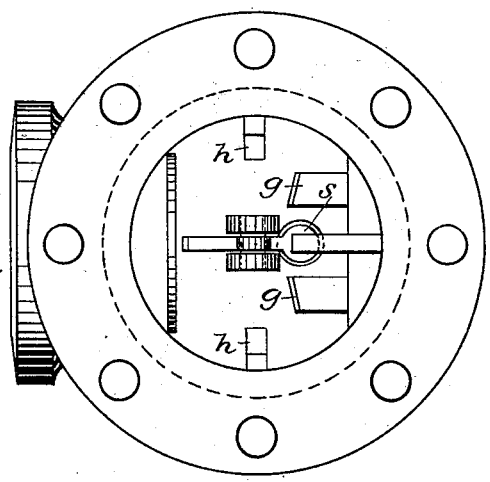
Figure 4:
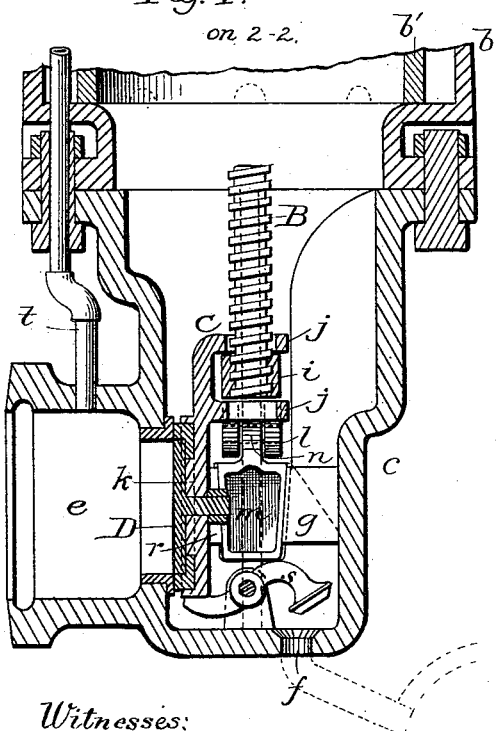
Figure 5:
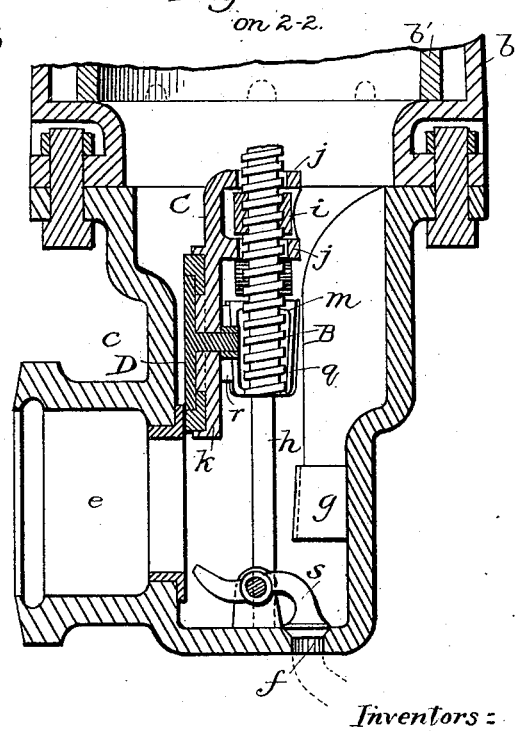

In the drawings, Figure 1 is a side view, partly in section, of a hydrant constructed in accordance with our invention; Fig. 2, a horizontal section on the line 1 1; Fig. 3, a similar view with the gates of the valve removed; Figs. 4 and 5, sectional views on the line 2 2, Fig. 2, showing the valve open and closed; Fig. 6, a section on the line 3 3 of Fig. 2, showing the valve closed; Figs. 7 and 8, detail views of the drinking-basin; and Figs. 9 to 15 are views illustrating certain details.

The invention relates to the construction of the hydrant proper, the valve, and the drinking-basin.

Referring to the drawings, A, Fig. 1, indicates the hydrant proper, consisting of an upper section or cap, $a$, an intermediate chamber, $b$, and a lower or valve chamber, $c$, said parts being secured together by bolts, as shown, or in any other equivalent manner. The upper section or cap, $a$, may be made more or less ornamental in appearance, and is provided with a lateral outlet, $d$, and with a hole in its top, through which the valve-stem passes, as shown in Fig. 1. The intermediate section, $b$, is made tapering, largest at its base, so that the upheaval of the ground by the frost will not cause a similar movement of the hydrant.

The portion or section $b$ is made of two thicknesses of metal, the inner shell, $b'$, containing the valve stem and rod and permitting access to the valve-chamber $c$, as shown in Figs. 1, 4, and 5.

The valve-chamber $c$ is provided with a lateral supply-opening, $e$, and with an outlet or discharge opening, $f$, in its bottom, as shown in Figs. 3, 4, and 5. As shown in said figures, the interior of the valve-chamber is provided on its rear with two lugs, $g$, and on its side with lugs $h$, the faces of the lugs $g$ and $h$ being inclined, as shown in Figs. 2, 3, 4, 5, and 6.

B indicates the valve-stem, the lower end of which is threaded and passes through a fixed nut, $i$, carried by a yoke or frame, C.

As shown in Figs. 4, 5, 6, and 15, the yoke C consists of a substantially-rectangular framing, $j$, in which the nut $i$ is placed, and by which it is prevented from turning. The framing $j$ projects laterally from a plate, $k$, to which is secured the sliding gate or disk D, the latter being attached to the yoke C in any usual or convenient manner. The upper and lower arms of the framing $j$ are perforated to allow the screw-stem B to pass freely therethrough.

From the lower arm, $j$, of the yoke C ears or lugs $l$ project—two on each side—which ears are perforated to receive a pin or bolt upon which the wedges $m$ are hung, the wedges having an ear, $n$, to fit between those carried by the yoke, as shown in Figs. 4 and 6.

The wedges are illustrated detached in Figs. 9 to 14, inclusive. They are made hollow, or are recessed, to render them light, but are so designed as to give the requisite strength, as will be seen by referring to the drawings. Their front and rear faces, $o$ $p$, are tapering or beveled, as are also their side faces, $q$. As shown in the drawings, the rear face, $p$, is not as wide as the front face, $o$, but is of about the same width as the ear $n$; but this is not a matter of importance. The face $p$ moves in contact with the incline $h$, and the faces $q$ move between the inclined lug $g$ and a lug, $r$, upon the face of the plate $k$ of yoke C. From this construction it follows that as the screw-stem B is turned it causes the yoke C or its framing $j$, carrying the nut $i$, to descend or ascend, according to the direction of rotation. The nut $i$ should be of such shape and size as to prevent its turning in the framing $j$.

Assuming that the screw-stem B be turned to the left, the yoke C and the wedges $m$, carried thereby, will descend, the latter striking against the inclines $g$ and $h$, and being urged thereby toward each other and toward the orifice $e$. This action is such as to cause the gate D to be held tightly against the mouth of the inlet $e$, and thereby to secure a perfectly tight joint. As the valve-gate D descends and shuts off the water, its lower edge strikes against the tail of a pivoted valve-plug, $s$, and tips or raises the latter, thus allowing the waste water to escape through the opening $f$.

This also serves another purpose, as will be presently explained.

It is often desirable that a basin or drinking-fountain be combined with the hydrant or plug, which basin shall be supplied from the same main as the hydrant. Such an arrangement is shown in Figs. 1, 7, and 8. Between the two shells $b$ $b'$ is a pipe, $t$, which connects with or is tapped into the lateral branch of the valve-chamber $c$, and which extends outward through shell $b$ at its upper end, as shown. Cast with or attached to the front side of the shell $b$ is a basin, E. A waste-pipe, $u$, connects the basin E with the interior of shell $b'$ and discharges the water from the basin into the interior of the hydrant, where it falls into chamber $c$ and is discharged through opening $f$ into a sewer or other receiver. The supply of water to pipe $t$ may be regulated or controlled by means of a valve placed in any convenient or desirable position. It is preferred, however, that the pipe $t$ be made so small as to prevent any undue waste of the water when no valve is employed.

An advantage of the construction of the hydrant above set forth is that the entire valve mechanism can be moved bodily up and out through the upper end of the inner shell, $b'$, without removing the earth or the outer casing of the hydrant.

The outlet-pipe $u$ may be omitted, and the waste water discharged into the space between the two shells $b$ and $b'$. In that case it would be necessary to perforate the lower end of the shell $b'$, as indicated in dotted lines in Figs. 4 and 5, so as to allow the water to escape from between the two shells into the interior of the valve-chamber $c$, and thence through opening $f$; but the plan illustrated and above described is deemed preferable, because it insures a body of confined air between the external atmosphere and the water, and naturally lessens danger of freezing.

The valve-gate proper may be attached to the plate $k$ by a joint permitting the gate to adapt itself to its seat.

We prefer to, and in practice do, construct the hydrant proper of only one tapering casing, the inner one, $b'$, being omitted, and we therefore do not wish to restrict ourselves to the use of the two concentric casings.

It will of course be understood that the main is laid below the frost-line, and that the upheaval occurs only from said line upward. Now, to prevent the body or shell from being lifted with the earth, it is necessary that said body extend down to or below the frost-line, or that it extend very nearly thereto and be firmly secured to the main or the bend extending below said line, and it is likewise necessary that the portion of the shell or case which is below ground shall be tapered to such an extent as will insure the withdrawal of the earth therefrom as said earth rises.

Having thus described our invention, what we claim is—

1. A hydrant-body composed of two concentric shells, separated, as shown and described, in combination with a basin secured to the outer shell, a supply-pipe for said basin, between the shells, and a discharge-pipe connecting the basin and the interior of the hydrant-body.

2. In combination with chamber $c$, having lugs or inclines $g$ and $h$, yoke C, consisting of frame $j$ and plate $k$, nut $i$, carried by frame $j$, screw-stem B passing through nut $i$ and frame $j$, gate D, carried by plate $k$, and pivoted wedges $m$, carried by the frame $j$, as shown.

3. In combination with chamber $c$ and lugs $g$ and $h$, yoke C, consisting of open frame $j$, plate $k$, and ears $l$, wedges $m$, pivoted in the latter, stationary nut $i$, carried by frame $j$, and disk D, secured to plate $k$, as shown.

4. The herein-described hydrant and drinking-fountain, consisting of a hydrant-body, a main gate controlling admission of water thereto, an outlet-opening from the interior of the hydrant-body, a valve controlling said outlet and adapted to be opened by the closing of the main gate, an external basin, a supply-pipe for said basin connected with the water-supply outside of the main gate, and a discharge-passage connecting the basin and the interior of the hydrant-body.

5. In combination with hydrant-body A, inlet $e$, gate D, outlet $f$, pivoted valve $s$, basin E, supply-pipe $t$, and discharge-pipe $u$, connecting the basin and the interior of the hydrant-body, all arranged as shown.

THADDEUS GALVIN.
JOHN GALVIN.

Witnesses:
JOHN W. STRACKBEIN,
W. S. ARMITAGE.